(12) United States Patent
Pelini

(10) Patent No.: US 12,379,066 B1
(45) Date of Patent: Aug. 5, 2025

(54) GRAPH MOUNT WITH TOOL AND ACCESSORY CADDY

(71) Applicant: Steven Pelini, Riverview, FL (US)

(72) Inventor: Steven Pelini, Riverview, FL (US)

( * ) Notice: Subject to any disclaimer, the term of this patent is extended or adjusted under 35 U.S.C. 154(b) by 186 days.

(21) Appl. No.: 18/197,886

(22) Filed: May 16, 2023

(51) Int. Cl.
*F16M 13/02* (2006.01)

(52) U.S. Cl.
CPC ................................ *F16M 13/022* (2013.01)

(58) Field of Classification Search
CPC ..................................................... F16M 13/022
See application file for complete search history.

(56) References Cited

U.S. PATENT DOCUMENTS

| | | | | |
|---|---|---|---|---|
| 4,103,982 A * | 8/1978 | Rudd | ............... | B60R 11/0205 |
| | | | | 439/297 |
| 6,113,047 A * | 9/2000 | Wung | ............... | B60R 11/0235 |
| | | | | 248/917 |
| 8,430,051 B1 * | 4/2013 | Allison | ............... | B63B 49/00 |
| | | | | 114/364 |
| 9,346,414 B1 * | 5/2016 | Kuhens | ............... | B60R 11/0258 |
| 10,293,900 B1 * | 5/2019 | Leonard | ............... | F16M 11/26 |
| 10,473,150 B2 * | 11/2019 | Carnevali | ............... | F16B 2/04 |
| 11,597,475 B2 * | 3/2023 | Price | ............... | B63B 17/00 |
| 12,228,674 B1 * | 2/2025 | Smith, Jr. | ............... | G01S 7/027 |
| 2009/0108151 A1 * | 4/2009 | Carnevali | ............... | F16B 47/00 |
| | | | | 248/205.5 |
| 2018/0216777 A1 * | 8/2018 | Speicher | ............... | B60K 35/50 |
| 2020/0002006 A1 * | 1/2020 | Slack, Jr. | ............... | A47C 7/622 |
| 2020/0023761 A1 * | 1/2020 | Nishimura | ............... | A47B 9/00 |
| 2021/0080047 A1 * | 3/2021 | Speicher | ............... | F16M 11/24 |
| 2023/0086318 A1 * | 3/2023 | Moore | ............... | A47B 5/04 |
| | | | | 108/50.02 |

OTHER PUBLICATIONS

Extreme max aluminum slider base sold on amazon first available date: Mar. 17, 2022 https://www.amazon.com/Extreme-Max-3005-4405-Aluminum-Systems/dp/B09VTG3ZM1 (Year: 2022).*
Millennium Marine double face electronic mount sold on amazon, first available date: Apr. 5, 2023 https://www.amazon.com/Marine-Electronic-Anodized-Aluminum-Adjustable/dp/B0C1M8L74H (Year: 2023).*
Miller Times Outdoors youtube video titled How to: install a dek-it mount by PROcise outdoors (stacked electronics mount) dated Jun. 25, 2020, https://www.youtube.com/watch?v=NcjyO_w5qMI (Year: 2020).*
Procise Outdoors Dek-It fish finder mount sold on amazon.com first available date: Oct. 3, 2015, https://www.amazon.com/dp/B06X3TPL9F?ref=emc_s_m_5_i_atc (Year: 2015).*

(Continued)

*Primary Examiner* — Terrell L McKinnon
*Assistant Examiner* — Ding Y Tan
(74) *Attorney, Agent, or Firm* — Edward P Dutkiewicz

(57) ABSTRACT

There is provided a bracket, a proximal swing arm, a distal swing arm and a caddy plate. The proximal swing arm is attached to the bracket. The distal swing arm is rotatably coupled to the proximal swing arm, and the caddy plate is rotatably coupled to the distal swing arm. The caddy plate has a plurality of holes there through for the holding of implements.

6 Claims, 5 Drawing Sheets

(56) References Cited

OTHER PUBLICATIONS

Ram mounts swing arm mount RAM-109HU for fish finder and chartplotters sold on amazon.com dated Oct. 1, 2001, https://www.amazon.com/RAM-Horizontal-Fishfinders-Chartplotters-RAM-109HU/dp/B001GLLF3l?th=1 (Year: 2001).*

Ram MDT display mount with double swing arms and tele-pole sold on amazon.com dated Apr. 22, 2014, https://www.amazon.com/RAM-MOUNTS-RAM-DIS-MDT1-8-SW2-Display-Double/dp/B00JUWNQVY (Year: 2014).*

* cited by examiner

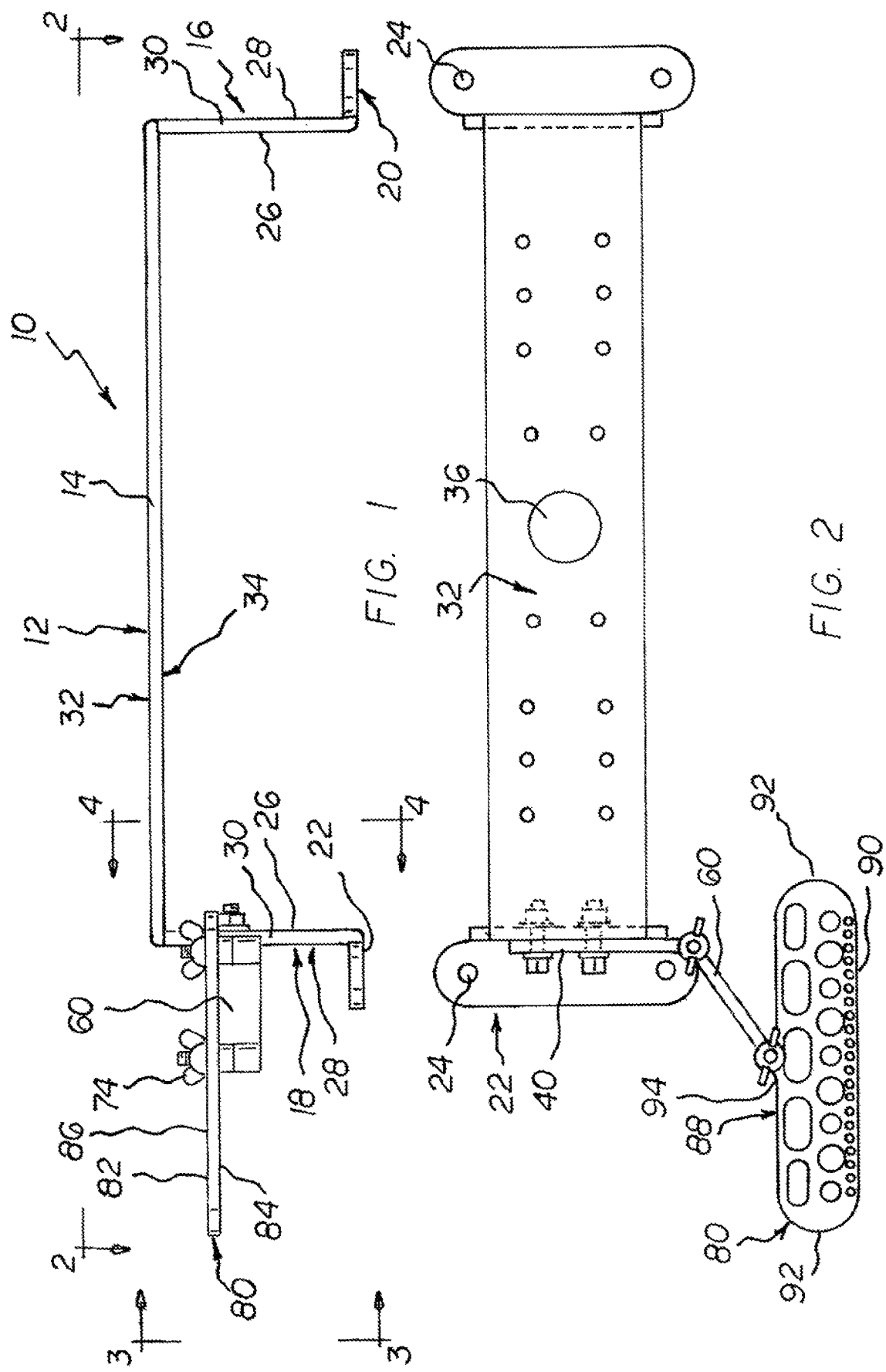

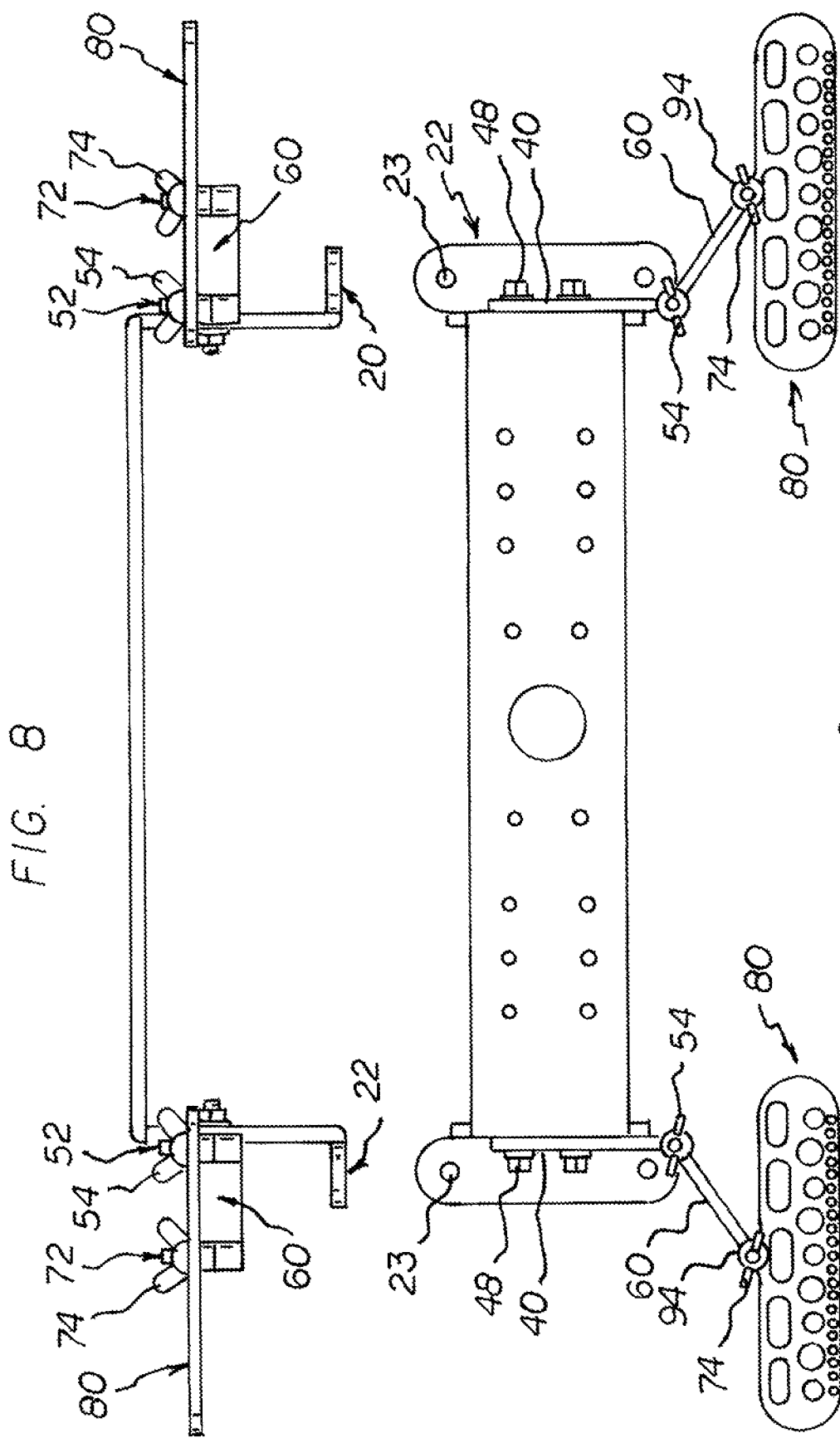

GRAPH MOUNT WITH TOOL AND ACCESSORY CADDY

BACKGROUND OF THE INVENTION

Disclosure

The Applicant has not submitted a related pending or patented non-provisional application within two months of the filing date of this present application. The invention is made by a single inventor, so there are no other inventors to be disclosed. This application is not under assignment to any other person or entity at this time.

There are no cross referenced or related applications which are direct to, or related to, the present application.

There is no research of development of this application which is federally sponsored.

FIELD OF THE INVENTION

The present invention relates to a graph mount with tool and accessory caddy and more particularly pertains to an addition of at least one implements caddy to a graph holder.

DESCRIPTION OF THE PRIOR ART

The use of an addition of at least one implements caddy to a graph holder is known in the prior art. More specifically, a device to hold a graph display device previously devised and utilized for the purpose of providing a convenient holder of a graph display are known to consist basically of familiar, expected, and obvious structural configurations, notwithstanding the number of designs encompassed by the prior art which has been developed for the fulfillment of countless objectives and requirements.

While the prior art devices fulfill their respective, particular objectives and requirements, the prior art does not describe graph mount with tool and accessory caddy that allows an addition of at least one implements caddy to a graph holder.

In this respect, the graph mount with tool and accessory caddy, according to the present invention, substantially departs from the conventional concepts and designs of the prior art, and in doing so provides an apparatus primarily developed for the purpose of providing a device for the addition of at least one implements caddy to a graph holder.

Therefore, it can be appreciated that there exists a continuing need for a new and improved graph mount with tool and accessory caddy which can be used for an addition of at least one implements caddy to a graph holder. In this regard, the present invention substantially fulfills this need.

SUMMARY OF THE INVENTION

In view of the foregoing disadvantages inherent in the known types of a device to hold a graph display device now present in the prior art, the present invention provides an improved graph mount with tool and accessory caddy. As such, the general purpose of the present invention, which will be described subsequently in greater detail, is to provide a new and improved graph mount with tool and accessory caddy which has all the advantages of the prior art and none of the disadvantages.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles or structures which are "coupled". "Directly joined" means that the two articles or structures are in contact with one another or are essentially continuous with one another.

In describing aspects of the invention, the word "generally" may be used. The term, "generally" when used to describe a configuration means that the configuration includes those aspects which are within normal manufacturing parameters of acceptance. By way of example, the term "generally round" may be used. This should be interpreted to mean that the configuration may be perfectly round, but may also have a radius which is not exact, but is within the manufacturing parameters. For example, a basketball may be generally round, but not be perfectly round.

By adjacent to a structure is meant that the location is near the identified structure.

To attain the goals addresses by this invention, the present invention essentially comprises a graph mount with tool and accessory caddy for holding devices and items, comprises several components, in combination.

There is a graph holding bracket. The graph holding bracket is fabricated of a rigid material. The graph holding bracket has a generally C-shaped configuration with a top portion and two leg portions, being a right leg portion and a left leg portion. Each leg portion of the graph holding bracket having a foot, being a right foot and a left foot. Each foot has at least one mounting hole there through for mounting the graph holding bracket to a surface.

Each leg of the graph holding bracket has at least one attachment hole there through. Each leg of the graph holding bracket has an inner surface and an outer surface, with a thickness there between. The thickness of each leg of the graph holding bracket forms an outer edge of each leg. The graph holding bracket top portion has an upper surface and a lower surface, with a thickness there between. The graph holding bracket has a central wire hole there through.

There is at least one proximal swing mount. The proximal swing mount is fabricated of a rigid material. The at least one proximal swing mount has a first portion and a second portion, with a length there between.

The first portion of the at least one proximal swing mount has at least one mounting hole there through. Each at least one mounting hole of the at least one proximal swing mount first portion has an associated proximal swing mount bolt. The at least one proximal swing mount is removeably coupled to a leg of the graph holding bracket by the associated proximal swing mount bolt. The associated proximal swing mount bolt passes through the at least one mounting hole of the at least one proximal swing mount first portion, and the at least one attachment hole of the graph holding bracket leg.

The second portion of the at least one proximal swing mount has an extension. The extension of the second portion of the at least one proximal swing mount has a threaded shaft extending there from. The threaded shaft of the second portion of the at least one proximal swing mount has an associated fastening means. A fastening means includes any one or more of a fastening means in the group of fastening means which includes, nuts, bolts, pins, snaps, wires, ties, clips, straps, screws, and clamps.

There is at least one distal swing mount. The at least one distal swing mount is fabricated of a rigid material. The at least one distal swing mount has a first portion and a second portion, with a length there between.

The first portion of the at least one distal swing mount has an extension having a shaft hole extending there through.

The first portion of the at least one distal swing mount is rotatably coupled to the second end of the at least one proximal swing mount.

The second portion of the at least one distal swing mount has an extension having a threaded shaft extending there from. The threaded shaft of the second portion of the at least one distal swing mount has an associated fastening means.

Lastly there is at least one caddy plate. The caddy plate is fabricated of a rigid material. The at least one caddy plate has an upper surface and a lower surface with a thickness there between. The thickness of the at least one caddy plate forms a caddy plate edge. The at least one caddy plate has a proximal edge and a distal edge, with a pair of arcuate edges coupling the proximal edge and the distal edge of the at least one caddy plate.

The proximal edge of the at least one caddy plate has a protuberance, with a hole there through the protuberance of the proximal edge of the at least one caddy plate. The protuberance of the proximal edge of the at least one caddy plate is rotatably coupled to the second end of the at least one distal swing mount.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved graph mount with tool and accessory caddy which has all of the advantages of the prior art and none of the disadvantages.

It is another object of the present invention to provide a new and improved graph mount with tool and accessory caddy which may be easily and efficiently manufactured and marketed.

It is further object of the present invention to provide a new and improved graph mount with tool and accessory caddy which is of durable and reliable constructions.

An even further object of the present invention is to provide a new and improved graph mount with tool and accessory caddy which is susceptible of a low cost of manufacture with regard to both materials and labor, and which accordingly is then susceptible of low prices of sale to the consuming public, thereby making such graph mount with tool and accessory caddy economically available to the buying public.

Even still another object of the present invention is to provide a graph mount with tool and accessory caddy for an addition of at least one implements caddy to a graph holder.

Lastly, it is an object of the present invention to provide a new and improved graph holding caddy which has a bracket. The bracket has an attached proximal swing mount. The proximal swing mount is rotatably coupled to a distal swing mount. There is a caddy plate which is coupled to the distal swing mount. The caddy plate has at least one hole there through for the receipt of removable items, such as hooks and tools.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is side elevational view of the device, showing one proximal swing arm, one distal swing arm, and one caddy plate.

FIG. 2 is a view along line 2-2 of FIG. 1.

FIG. 8 is side elevational view of the device, showing a plurality of proximal swing arms, a plurality of distal swing arms, and a plurality of caddy plates.

FIG. 9 is a top plan view, showing a plurality of distal swing arms and a plurality of caddy plates.

The same reference numerals refer to the same parts throughout the various Figures.

DESCRIPTION OF THE PREFERRED EMBODIMENT

Figure 3:
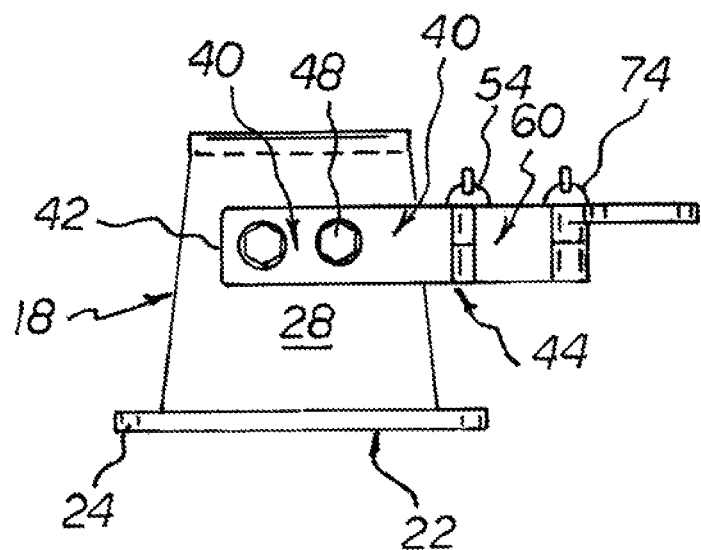
FIG. 3 is a view along line 3-3 of FIG. 1.
Figure 4:
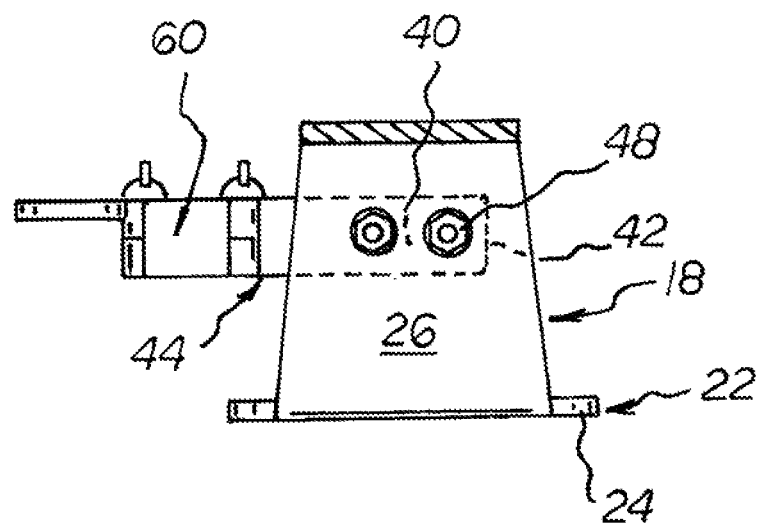
FIG. 4 is a view along line 4-4 of FIG. 1.
Figure 5:
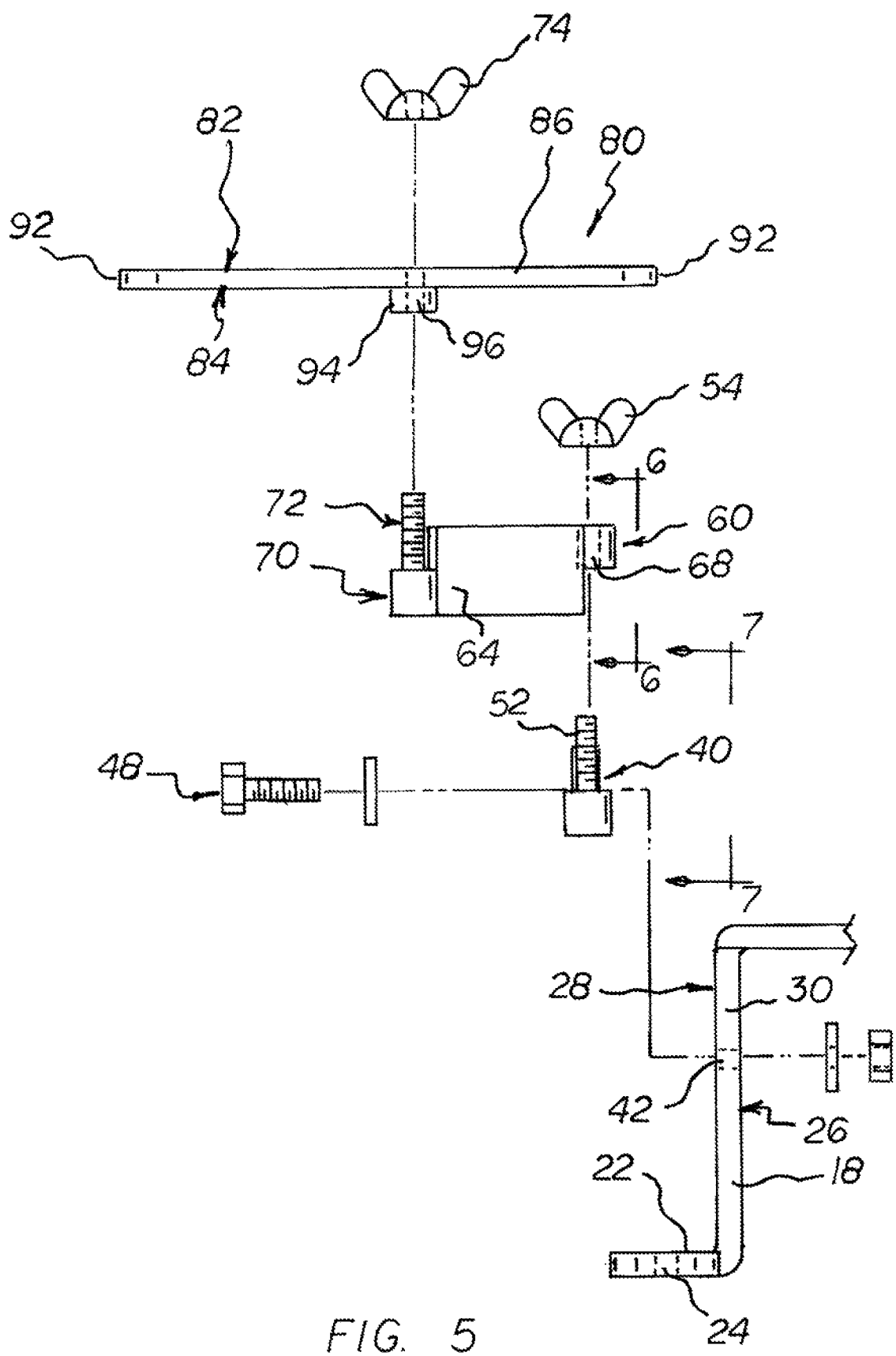
FIG. 5 is an exploded view of the device.
Figure 6:
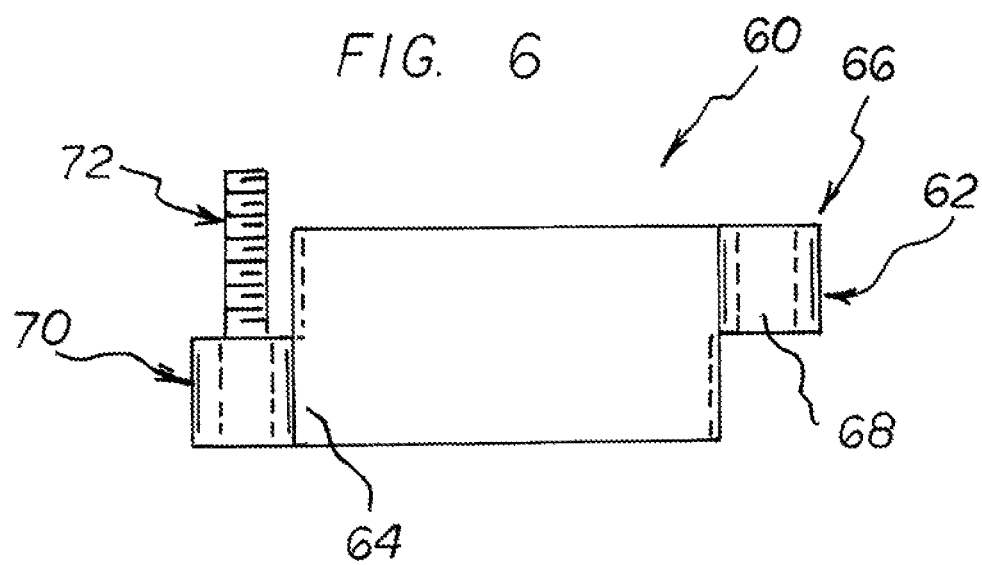
FIG. 6 is a view taken along line 6-6 of FIG. 5.
Figure 7:
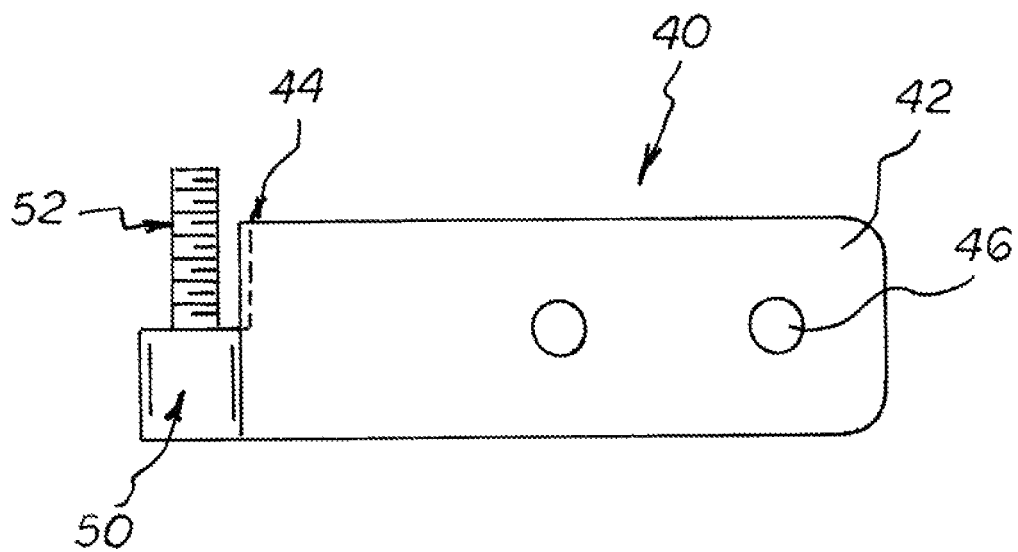
FIG. 7 is a view taken along line 7-7 of FIG. 5.

With reference now to the drawings, and in particular to FIG. 1 thereof, the preferred embodiment of the new and improved graph mount with tool and accessory caddy embodying the principles and concepts of the present invention and generally designated by the reference numeral 10 will be described.

The present invention, the graph mount with tool and accessory caddy 10 is comprised of a plurality of components. Such components in their broadest context include a bracket, a proximal swing arm, a distal swing arm and a caddy plate. Such components are individually configured and correlated with respect to each other so as to attain the desired objective.

A graph mount with tool and accessory caddy 10 for holding devices and items is herein described. The graph mount with tool and accessory caddy comprises several components, in combination.

There is a graph holding bracket 12. The graph holding bracket is fabricated of a rigid material. The graph holding bracket has a generally C-shaped configuration with a top portion 14 and two leg portions, being a right leg portion 16 and a left leg portion 18. Each leg portion of the graph holding bracket having a foot, being a right foot 20 and a left foot 22. Each foot has at least one mounting hole 23 there through for mounting the graph holding bracket to a surface.

Each leg of the graph holding bracket has at least one attachment hole 24 there through. Each leg of the graph holding bracket has an inner surface 26 and an outer surface 28, with a thickness there between. The thickness of each leg of the graph holding bracket forms an outer edge 30 of each leg.

The graph holding bracket top portion has an upper surface 32 and a lower surface 34, with a thickness there between. The graph holding bracket has a central wire hole 36 there through.

There is at least one proximal swing mount 40. The proximal swing mount is fabricated of a rigid material. The at least one proximal swing mount has a first portion 42 and a second portion 44, with a length there between.

The first portion of the at least one proximal swing mount has at least one mounting hole 46 there through. Each at least one mounting hole of the at least one proximal swing mount first portion has an associated proximal swing mount bolt 48. The at least one proximal swing mount is removeably coupled to a leg of the graph holding bracket by the associated proximal swing mount bolt. The associated proximal swing mount bolt passes through the at least one mounting hole of the at least one proximal swing mount first portion, and the at least one attachment hole of the graph holding bracket leg.

The second portion of the at least one proximal swing mount has an extension 50. The extension of the second portion of the at least one proximal swing mount has a threaded shaft 52 extending there from. The threaded shaft of the second portion of the at least one proximal swing mount has an associated fastening means 54. A fastening means includes any one or more of a fastening means in the group of fastening means which includes, nuts, bolts, pins, snaps, wires, ties, clips, straps, screws, and clamps.

There is at least one distal swing mount 60. The at least one distal swing mount is fabricated of a rigid material.

The at least one distal swing mount has a first portion 62 and a second portion 64, with a length there between.

The first portion of the at least one distal swing mount has an extension 66 having a shaft hole 68 extending there through. The first portion of the at least one distal swing mount is rotatably coupled to the second end of the at least one proximal swing mount.

The second portion of the at least one distal swing mount has an extension 70 having a threaded shaft 72 extending there from. The threaded shaft of the second portion of the at least one distal swing mount has an associated fastening means 74.

Lastly there is at least one caddy plate 80. The caddy plate is fabricated of a rigid material. The at least one caddy plate has an upper surface 82 and a lower surface 84 with a thickness there between. The thickness of the at least one caddy plate forms a caddy plate edge 86. The at least one caddy plate has a proximal edge 88 and a distal edge 90, with a pair of arcuate edges 92 coupling the proximal edge and the distal edge of the at least one caddy plate.

The proximal edge of the at least one caddy plate has a protuberance 94, with a hole 96 there through the protuberance of the proximal edge of the at least one caddy plate. The protuberance of the proximal edge of the at least As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A graph mount with tool and accessory caddy for holding devices and items, comprising, in combination:

a graph holding bracket with the graph holding bracket having a generally C-shaped configuration with a top portion and two leg portions, being a right leg portion and a left leg portion, each leg portion having a foot being a right foot and a left foot, each foot of the graph holding bracket having at least one mounting hole there through for mounting the graph holding bracket to a surface;

an at least one proximal swing mount, the at least one proximal swing mount having a first portion and a second portion, with a length there between, the at least one proximal swing mount being coupled to the graph holding bracket, the first portion of the at least one proximal swing mount having at least one mounting hole there through, with each at least one mounting hole of the at least one proximal swing mount first portion having an associated proximal swing mount bolt;

an at least one distal swing mount, the at least one distal swing mount having a first portion and a second portion, with a length there between, the at least one distal swing mount being coupled to the at least one proximal swing mount, the first portion of the at least one distal swing mount having an extension with the extension of the at least one distal swing mount having a shaft hole extending there through; and, an at least one caddy plate, the at least one caddy plate having an upper surface and a lower surface with a thickness there between, with the thickness of the at least one caddy plate forming a caddy plate edge, the at least one caddy plate being coupled to the at least one distal swing mount, the at least one caddy plate having a proximal edge and a distal edge with a pair of arcuate edges being continuous with the proximal edge and the distal edge of the at least one caddy plate, the at least one caddy plate proximal edge being coupled to the second portion of the at least one distal swing mount.

2. The graph mount with tool and accessory caddy for holding devices and items, as described in claim 1 with the graph mount with tool and accessory caddy further comprising:

the second portion of the at least one proximal swing mount having an extension comprising a threaded shaft extending there from, with the threaded shaft of the second portion of the at least one proximal swing mount having an associated fastening means, the threaded shaft of the at least one proximal swing mount rotatably coupling the second portion of the proximal swing mount to the first portion of the at least one distal swing mount, the first portion of the at least one distal swing mount being rotatably coupled to the second end of the at least one proximal swing mount by the threaded shaft of the second portion of the proximal swing mount passing through the distal swing mount first portion extension shaft hole;

the second portion of the distal swing mount having an extension comprising a threaded shaft, the threaded shaft of the second portion of the distal swing mount having an associated fastening means, the threaded shaft of the second portion of the at least one distal swing mount rotatably coupling the distal swing mount to the at least one caddy plate; and, the proximal edge of the at least one caddy plate having a protuberance with a hole through the protuberance of the proximal edge of the at least one caddy plate, the protuberance of the proximal edge of the at least one caddy plate being rotatably coupled to the second end of the at least one distal swing mount.

3. The graph mount with tool and accessory caddy for holding devices and items, as described in claim 2 with the graph mount with tool and accessory caddy further comprising:

each leg of the graph holding bracket having an inner surface and an outer surface with a thickness there between, with the thickness of each leg forming an outer edge of each leg; and, the at least one proximal swing mount being removeably coupled to one of the legs of the graph holding bracket by the associated proximal swing mount bolt, the associated proximal swing mount bolt passing through the at least one mounting hole of the at least one proximal swing mount first portion and the at least one attachment hole of the graph holding bracket leg.

4. The graph mount with tool and accessory caddy for holding devices and items, as described in claim 3 with the at least one graph mount with tool and accessory caddy further comprising:

each leg of the graph holding bracket having at least one attachment hole there through; and, the graph mount with tool and accessory caddy further comprising the graph holding bracket having a central wire hole there through.

5. The graph mount with tool and accessory caddy for holding devices and items, as described in claim 4 with the graph mount with tool and accessory caddy further comprising:

the graph holding bracket top portion having an upper surface and a lower surface with a thickness there between;

the graph holding bracket fabricated of a rigid material;

the proximal swing mount fabricated of a rigid material;

the at least one distal swing mount being fabricated of a rigid material; and, the at least one caddy plate being fabricated of a rigid material.

6. The graph mount with tool and accessory caddy for holding devices and items, as described in claim 5 with the graph mount with tool and accessory caddy further comprising:

each leg of the graph holding bracket having an inner surface and an outer surface with a thickness there between, with the thickness of each leg forming an outer edge of each leg; and, the at least one proximal swing mount being removeably coupled to one of the legs of the graph holding bracket by the associated proximal swing mount bolt, the associated proximal swing mount bolt passing through the at least one mounting hole of the at least one proximal swing mount first portion and the at least one attachment hole of the graph holding bracket leg.

\* \* \* \* \*